(12) United States Patent
Lee (10) Patent No.: US 8,749,502 B2
(45) Date of Patent: Jun. 10, 2014

(54) SYSTEM AND METHOD FOR VIRTUAL TOUCH SENSING (76) Inventor: Chi Ching Lee, Hong Kong (HK)

( * ) Notice: Subject to any disclaimer, the term of this patent is extended or adjusted under 35 U.S.C. 154(b) by 577 days.

(21) Appl. No.: 13/097,062

(22) Filed: Apr. 29, 2011

(65) Prior Publication Data

US 2012/0001845 A1 Jan. 5, 2012

(30) Foreign Application Priority Data

Jun. 30, 2010 (HK) .................................... 10106409

(51) Int. Cl.
G06F 3/041 (2006.01)
(52) U.S. Cl.
USPC .......................... 345/173; 345/174; 178/18.01
(58) Field of Classification Search
USPC ...................... 345/173–179; 178/18.01–18.04
See application file for complete search history.

(56) References Cited

U.S. PATENT DOCUMENTS

| 2010/0102941 | A1 | 4/2010 | Richter | |
|---|---|---|---|---|
| 2010/0103127 | A1 | 4/2010 | Park | |
| 2010/0328267 | A1* | 12/2010 | Chen | 345/175 |
| 2011/0199335 | A1* | 8/2011 | Li et al. | 345/175 |

FOREIGN PATENT DOCUMENTS

| CN | 1322329 | 11/2001 |
|---|---|---|
| CN | 1975638 | 6/2007 |
| CN | 101017415 | 8/2007 |
| CN | 101033963 | 9/2007 |
| CN | 101335783 | 12/2008 |
| CN | 101727181 | 6/2010 |
| CN | 101729628 | 6/2010 |
| JP | 2010108118 | 5/2010 |
| TW | 200941302 | 10/2009 |

* cited by examiner

Primary Examiner — Kimnhung Nguyen
(74) Attorney, Agent, or Firm — Eagle IP Limited; Jacqueline C. Lui (57) ABSTRACT In view of existing mobile devices which have the limitation of relatively small area of the touch screen, the present invention describes a virtual touch sensing method based on computer vision technology. The method includes the steps of using more than one sensor to detect the coordinates of an indicator in a virtual touching area, and calculating the respective screen coordinates according to the coordinates of the indicator, where the area of the operation surface of the virtual touching area is independent to the area of the screen. The present invention also disclosed a corresponding virtual touch sensing system which provides a predictive control interface, where the area of the control interface is independent to the area of the actual screen.

18 Claims, 10 Drawing Sheets

SYSTEM AND METHOD FOR VIRTUAL TOUCH SENSING

FIELD OF INVENTION

This invention relates to a user input device, especially a system and method for virtual touch sensing.

BACKGROUND OF INVENTION

At current time, the mobile phones are being developed mainly at two directions, one is voice-oriented and the other one is smart-phone. Smart-phones are equipped with powerful processing capability besides the telephone function, and it is similar to a microcomputer, which integrates many functions such as communication, Personal Digital Assistant (PDA) and entertainment.

In order to display a lot of information, the smart-phone requires a large screen, and this is one reason that quite often a smart-phone would discard the keypad and uses a touch screen instead. In this way, not only the space on the smart-phone is saved, but also the smart-phone can have diversified interface. For common mobile phones that designed for finger touch sensing, the virtual keypads on the screen need to be enlarged to obtain larger touch area, so as to reduce the mis-touch rate. As a result, the screen size also needs to be enlarged, and the dimension of the whole mobile phone is more than 20-30%, or even 50% larger than other mobile phones. It will be difficult to carry away a large mobile phone as well as hard to use it by single hand.

SUMMARY OF INVENTION

In the light of the foregoing background, it is an object of the present invention to provide an alternate system and method for virtual touch sensing by fingers on a small screen, which can significantly reduce the dimension of the mobile device and greatly increase the usable area of the input interface, resulting in an more convenient use of the input interface.

Accordingly, the present invention, in one aspect, is a method for virtual touch sensing, which includes the following steps: use more than one sensors to detect the coordinates of an indicator in the virtual sensing space, and calculate the corresponding screen coordinates in the display according to the coordinates of the indicator. The area of the operation plane of the virtual sensing space is independent to that of the display.

In another aspect of the present invention, the present invention is a system for virtual touch sensing, which includes a microprocessor, a display and more than one sensors. The sensors detect the coordinates of the indicator in the virtual sensing space. The microprocessor calculates the screen coordinates on the display according to the coordinates of the indicator. The area of the operation plane of the virtual sensing space is independent to that of the display.

The present invention provides a predictive operation interface based on 3-dimensional computer visual and motion detection technologies, and targeting the limitation of existing mobile devices which have touching screen with relatively small screen size. The operation interface can has an area larger than that of the physical screen. The present invention obtains the location of the 3-dimensional space of the user's fingertip by camera, projects the fingertip on the screen and shows it as a mouse cursor. When the mouse cursor enters the region of an option/virtual key on the screen, then this option (key) is set as a default item, which is displayed using a different color/style. There are three operations modes of the present invention, which project the operation interface above or below the mobile device at arbitrary angle. The user can complete the input of an option by clicking on the virtual operation interface or on the touch screen (according to certain operation mode), without having to click accurately on the option/virtual key. The present invention enables multi-fingertip (multi-touch) operation, and allows the user to hold the device by both hands and click rapidly by using two thumbs. The design of the present invention provides a virtual operation interface. Since it is not limited by the area of the actual operation interface of the mobile device, a virtual operation interface larger than the original operation interface can be provided. This greatly increases the accuracy of pressing the keys, and thus more keys can be placed on a smaller screen for the user's input.

DETAILED DESCRIPTION OF THE PREFERRED EMBODIMENTS

As used herein and in the claims, "comprising" means including the following elements but not excluding others.

As used herein and in the claims, "couple" or "connect" refers to electrical coupling or connection either directly or indirectly via one or more electrical means unless otherwise stated.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
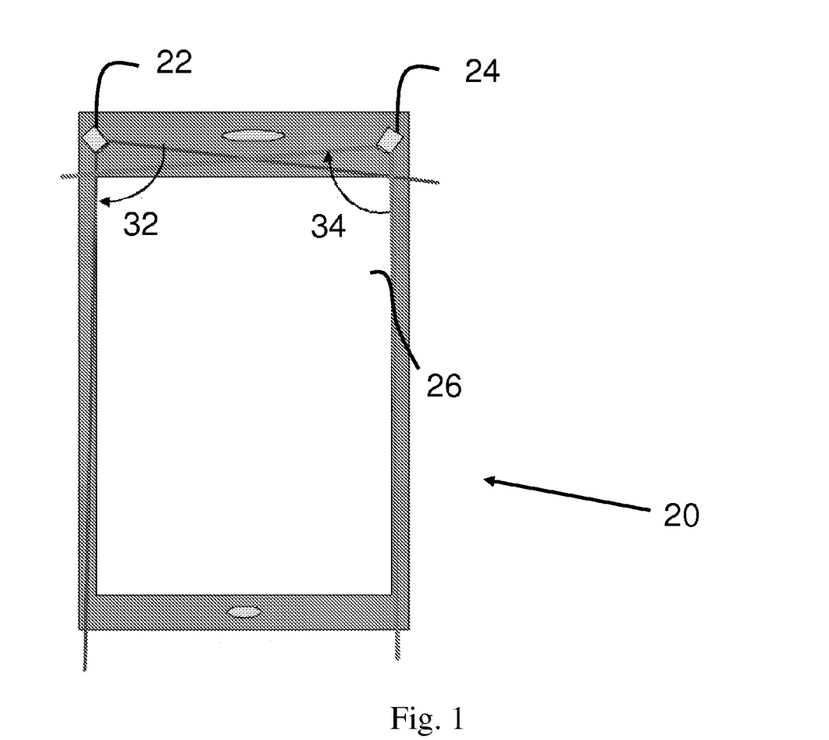
FIG. 1 shows a mobile device with cameras installed on two edge corners of the screen, according to one embodiment of the present invention.

Now refer to FIG. 1, in which a first embodiment of the present invention is a mobile device 20, which has two cameras 22 and 24 installed on the left and right edge corners of the display screen 26. The two cameras 22 and 24 are sensors for detecting the indicator (e.g. the fingertip of a user). The horizontal viewing rage 32 and 34 substantially pointing to the central position of the screen 26.

Figure 2:
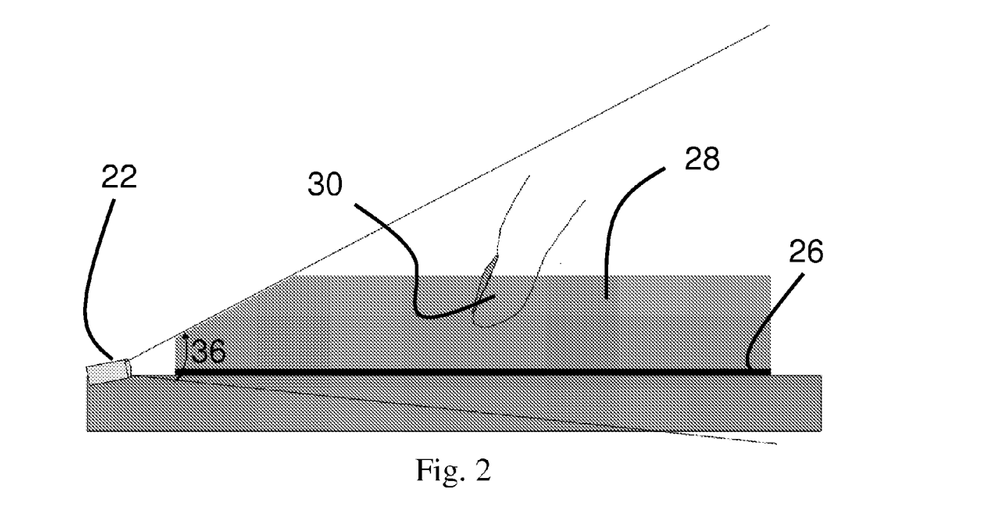
FIG. 2 is a side view of the operation by a user using his finger to operating in the virtual sensing space on the mobile device in FIG. 1.

In FIG. 2, one can see that the camera 22 (as well as camera 24) has a certain vertical viewing range 36. However, since part of the viewing range of the camera 22 and 24 are blocked by the body of the mobile device, only the space above the screen 26 can be used as the virtual sensing space 28. The fingertip 30 of the user can move within the virtual sensing space 28 and performs virtual touch. The detailed flow will be described later.

Figure 3:
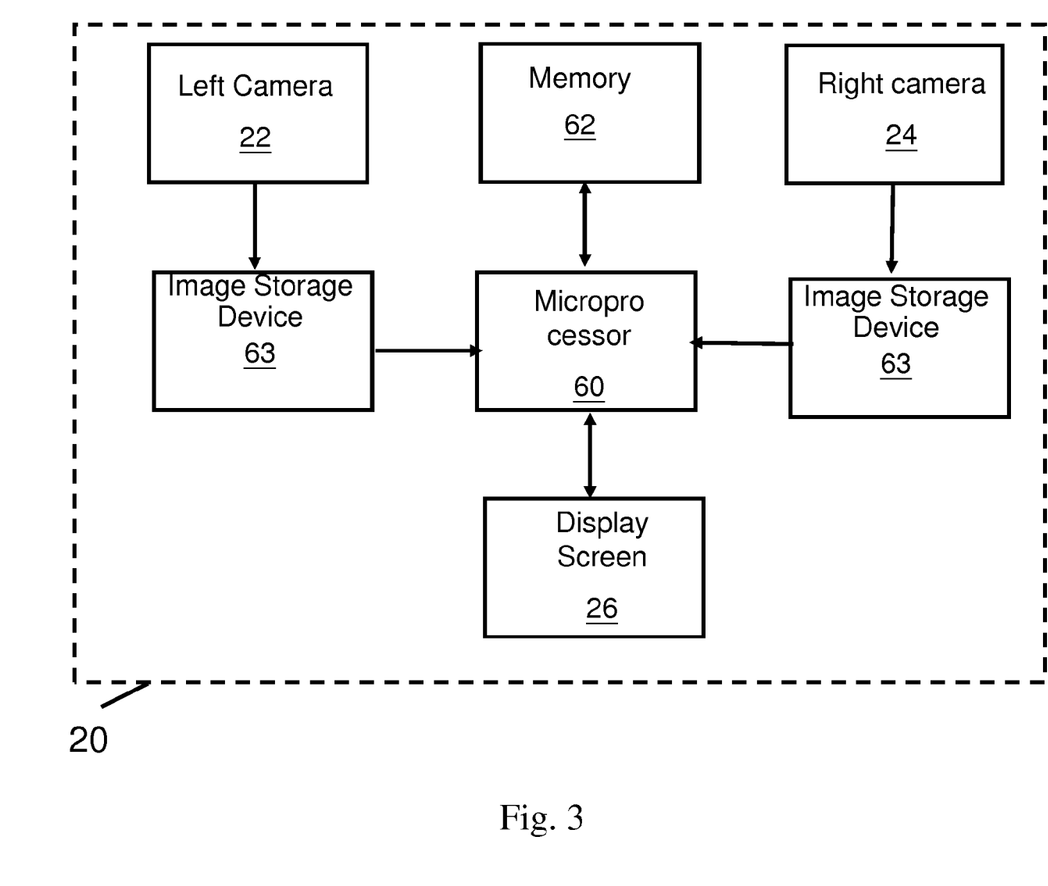
FIG. 3 is system block diagram of the mobile device with cameras according to one embodiment of the present invention.

The system structure of the mobile device according to one embodiment of the present invention is shown in FIG. 3. The mobile device 20 includes a left camera 22, a right camera 24, a display screen 26, a microprocessor 60, a memory 62, and two image storage devices 63 connected to the left camera 22 and right camera 24, respectively. The microprocessor 60 connects to the other components and controls them. The microprocessor 60 is also responsible for instruction computation of the software installed in the mobile device 20. The memory 62 stores the aforementioned software so that the mobile 20 can perform its function normally. The screen 26 displays the user interface to the user according to the control by the microprocessor 60. In a preferred embodiment, the screen 26 is a touch screen, which can receive user's touch control. The images captured by the left camera 22 and right camera 24 are stored separately in two image storage device 63. The microprocessor 60 then reads the images captured by the left camera 22 and right camera 24 which are stored in the two image storage device 63, in order to detect the coordinates of the indicator. In a preferred embodiment, the left camera 22 and right camera 24 shoots thirty images per second. The detection process will be described in details as follows.

Figure 4:
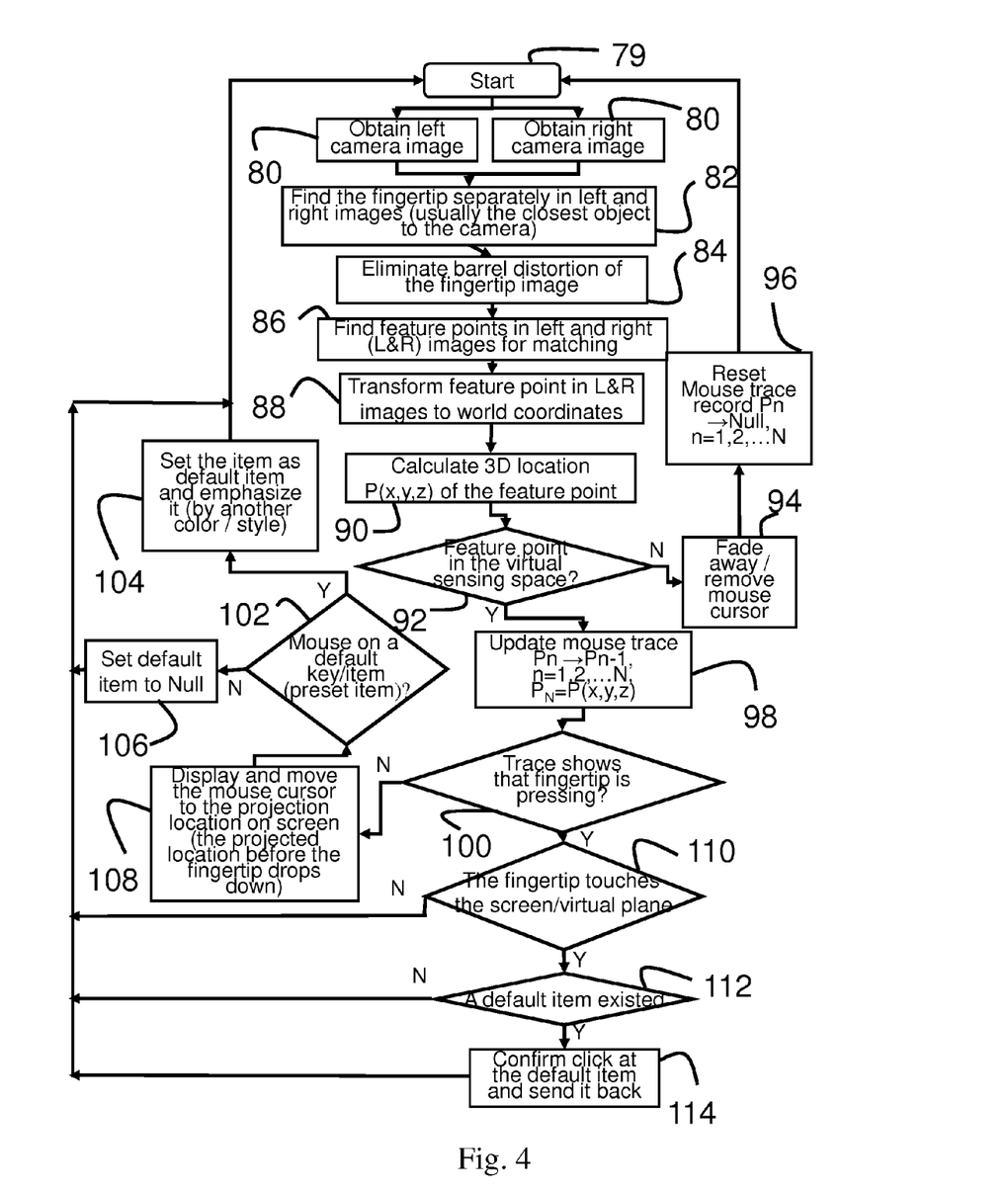
FIG. 4 is a flow chart showing the working flow of the virtual touch sensing method, according to one embodiment of the present invention.
Figure 5:
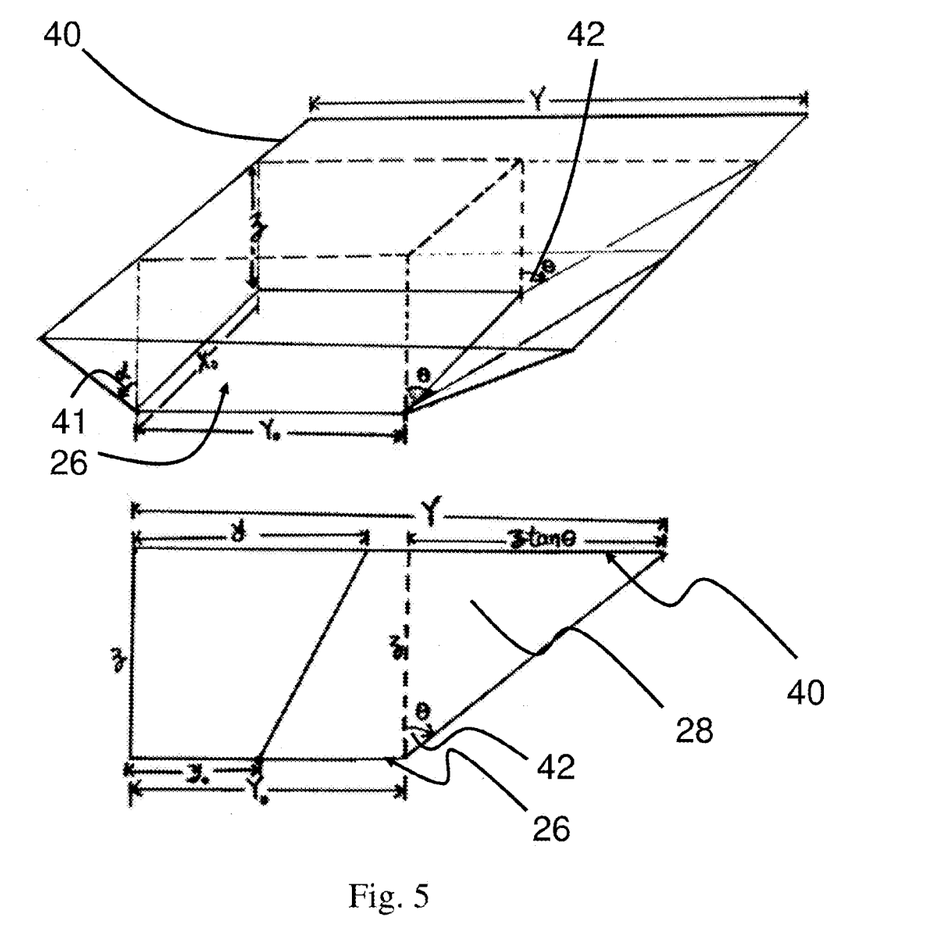
FIG. 5 illustrates the space relation between the operation plane of the virtual sensing space and the display of the mobile device, according to one embodiment of the present invention.

FIG. 4 shows the flow chart of the virtual touch sensing method according to one embodiment of the present invention, of which each step will be described as follows. In this embodiment, a mobile device as shown in FIG. 1 and FIG. 2 are used for performing virtual touch sensing. All the software computations used in the method are completed in microprocessor 60. The method starts from the starting point 79. The first step is to obtain the left camera image and right camera image of the indicator (fingertip of the user) by the left camera 22 and right camera 24 respectively in step 80. As shown in FIG. 5, the virtual sensing space 28 as mentioned previously is the 3-dimensional space above the screen 26. The indicator can freely move in 3-dimensions in the virtual sensing space 28, and the area and position of virtual sensing space is related to the viewing angle of the camera. Here the operation plane 40 of the virtual sensing space 28 is defined as a surface on which the indicator moves. The surface needs not to be a 2-dimensional flat surface, but can be any surface in a 3-dimensional space, for instance a curved surface. Every location of the indicator on the surface corresponds to a 2-dimensional coordinates on the screen 26. In the embodiment as shown in FIG. 5, the operation plane 40 is a 2-dimensional flat surface which is substantially parallel to the screen 26 in the virtual sensing space 28. It is clear that no matter how much is the vertical height (i.e. the value of the coordinate z) of the operation plane with respect to the screen 26, the area of the operation plane 40 is larger than that of the screen 26. This is decided by the trapezoidal relation formed by the screen 26 and virtual sensing space 28. The screen 26 is the upper base of the trapezoid and the operation plane 40 is the lower base of the trapezoid. As long as the virtual sensing space is within the capturing range of the left and right sensors (cameras), the virtual sensing space can be dynamically adjusted, without changing the orientation and angle of the cameras. The inclination of the non-parallel sides of the trapezoid in FIG. 5 (Angle θ42 and Angle α41) can be adjusted, such that the area of the operation plane 40 at a certain height can be adjusted dynamically.

After obtaining the left camera image and the right camera image of the indicator, the indicator must be identified separately in the left camera image and the right camera image, as shown in Step 82. The indicator is usually the closet object to the camera. If the coordinates of the left and right camera are not parallel (i.e. $\angle Z_L Z_R \neq 0$ in FIG. 6) or the camera introduced image distortion (such as the Barrel Distortion in Fisheye camera), then Step 84 in FIG. 4 must be first performed to do rotation coordinates transformation and image correction. Both rotation coordinates transformation and image correction are prior art that well known by those skilled in the art.

Figure 6:
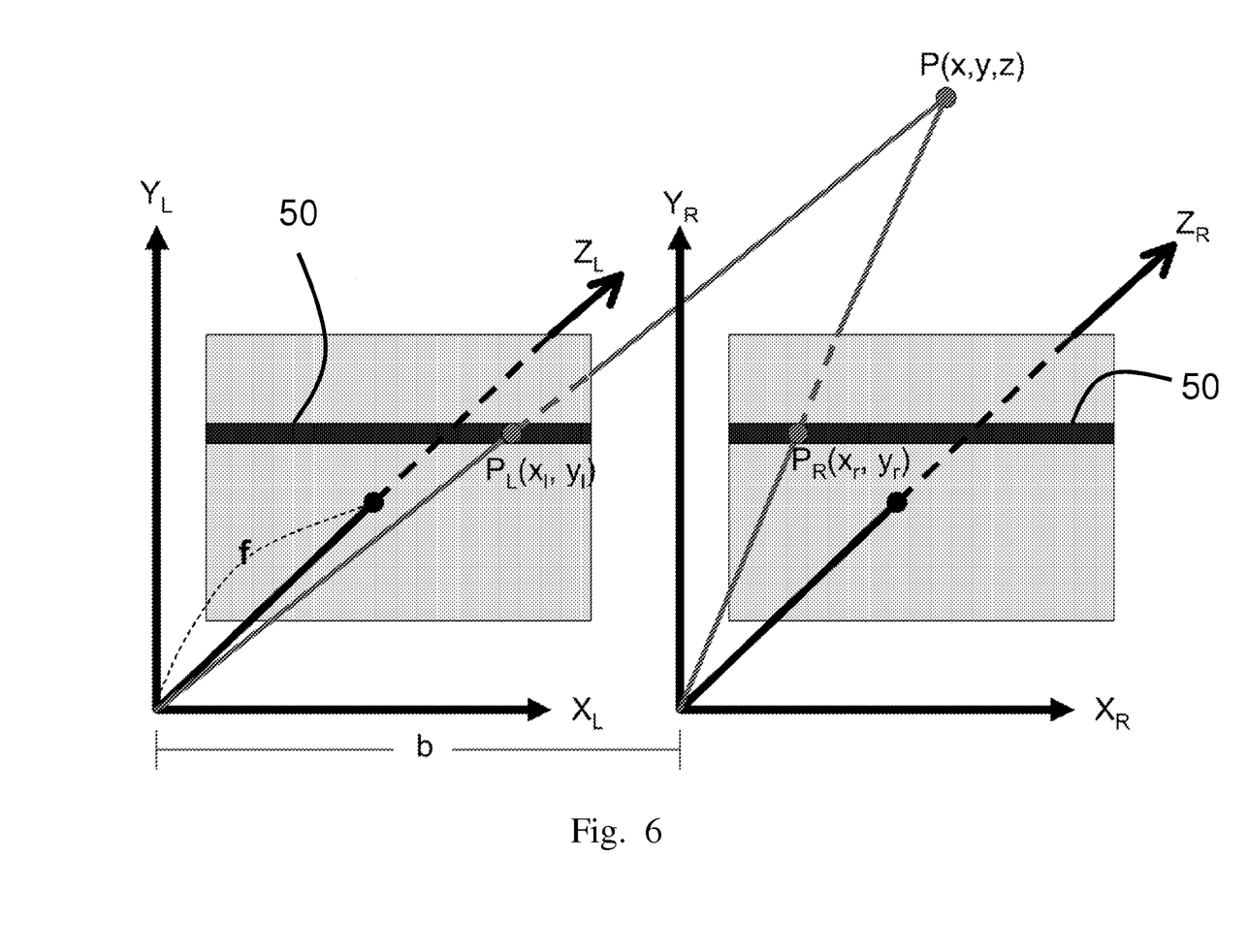
FIG. 6 is a schematic diagram showing the detection of the geometrical relation of the 3-dimensional coordinates of the indicator in the virtual sensing space by two cameras, according to one embodiment of the present invention.

FIG. 6 displays a schematic diagram of the coordinates when the two cameras at left and right detect the indicator in the virtual sensing space and calculate its 3-dimensional coordinates. To simplify the matching process of the indicator images obtained by the left and right cameras, the left and right images will preferably be matched using a feature point on the indicator, which is deemed as the central point of the indicator. Firstly, in Step 86 the central point of the indicator is found in the left image and right image separately. Assuming the image of the feature point on the user's fingertip has a 3-dimensional coordinates of P(x, y, z), and the corresponding locations of this point in the images captured by the left and right cameras are two points $P_L(x_l, y_l)$ and $P_R(x_r, y_r)$ on the epipolar line respectively, then the world coordinate or say 3-dimensional coordinate P(x, y, z) of the feature point can be calculated using the following equation in Step 88 and 90:

$$x = b(x_l + x_r)/[2(x_l - x_r)]$$

$$y = b(y_l + y_r)/[2(y_l - y_r)]$$

$$z = bf/(x_l - x_r) \qquad \text{Equation 1}$$

wherein f is the focal length of camera 22 and 24, and b is the line distance between camera 22 and 24.

Figure 7:
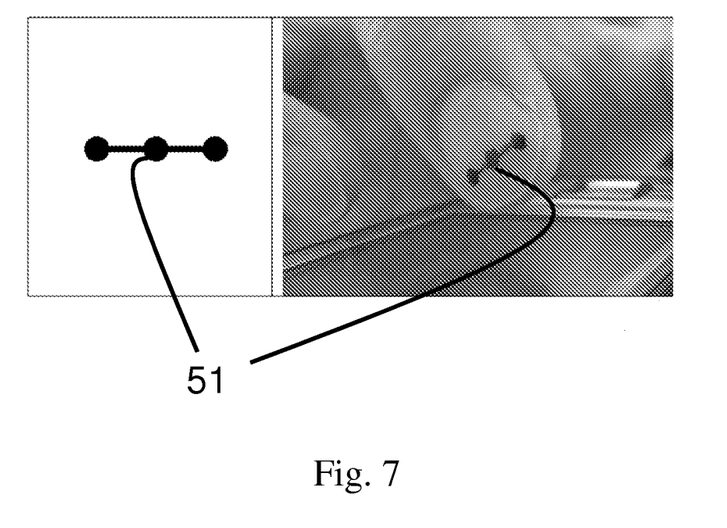
FIG. 7 shows the marking on the fingertip to facilitate the detection by the cameras, according to one embodiment of the present invention.

It was mentioned above that there is a feature point on the indicator that facilitate matching of the identical points in the indicator images captured by the left and right cameras. In one embodiment, the indicator is the fingertip of the user, and thus the feature point could be the tip searched on the edge of the nail. In another embodiment, for mobile device with relatively low computation power, a marking can added on the fingertip for fast calculation of the feature point. In one embodiment, the marking on the fingertip is the feature image to simplify the image recognition process, thus the matching point of the left and right images can be found quickly. The feature image should be able to be identified from different angle/orientation, or even when part of it is covered. An exemplary feature image is shown in FIG. 7, which is a short straight line with three round dots on it. The middle point 51 is the matching point of the left and right images. In normal cases, the image captured by the left or right camera can have at least one round point in the image. Then, depending on the feature value (e.g. dot distance) and orientation of the image, the location of the central point can be calculated. Besides a straight line with three dots, other different types of pattern/symbol can also be used for marking to facilitate matching of the left and right image by the microprocessor.

Now return to FIG. 4, the central point of the fingertip needs to be determined as whether it is in the virtual sensing space in Step 92, after calculating the 3-dimensional coordinates of the feature point of the user's fingertip. According to the preset 3-dimensional coordinates of the virtual sensing space, it can be determined that whether the 3-dimensional coordinates of the feature point of the user's fingertip fall within the rage of the virtual sensing space. If the central point of the user's fingertip is not in the virtual sensing space, then the method goes to Step 94, in which the mouse cursor (if visible) to fade away or erased on the screen. Afterwards, the trace record of the mouse in Step 96 is reset, i.e. let $P_n$=Null and n=1, 2, . . . N. Finally, the method goes back to the starting point 79 of the original state to wait for next detection (Pn is the past record of trace of the moust).

If the central point of the user's fingertip is in the virtual sensing space, then the method goes to Step 98. The software installed in the mobile device will make the mouse cursor visible on a location on the screen which corresponds to the central point of the fingertip. If the fingertip moves substantially in the aforementioned operation plane, then the mouse cursor on the screen moves according to the movement of the fingertip (just like the shadow of the fingertip is projected on the screen). At the same time, the trace record of the mouse is updated, i.e. let $P_{n-1}=P_n$, where n=1, 2, . . . N, and $P_N$=P(x, y, z). One of the purposes to record the mouse trace is to determine in Step 100 whether the user fingertip has made a click action, i.e. a movement of hitting to the screen of the device in substantially vertical direction. If it is determined that the fingertip is performing a click action according to the mouse trace record, then the method goes to Step 110 to wait for the user's fingertip to hit the surface of the screen of the mobile device. If the fingertip already hit the screen, then the method continues to go to Step 112.

In the embodiment as shown in FIG. 4, the display screen of the mobile device can be divided into at least one region. This region is the clickable element range of a preset key. The clickable element refers to any element in the display that may be selected by the user and become a control command inputted by the user, which includes but not limited to keys of the virtual keyboard, drop-down menu, buttons, textbox, scroll bar, links or other input components. The preset key can be a virtual key on the simulated keyboard on the screen, or a command or button in a dialogue box or box. A preset key can be set as a default item. In Step 112, if there is a default item existed when the fingertip hits the screen, then the method goes to Step 114. In Step 114, the hit of the fingertip at the screen will be treated as the selection of the default item by the user. The item will then be transferred back to the system as an input from the user. If in Step 112, there is no default item when the fingertip hits the screen, then the whole process goes back to the starting point 79, and continues to wait for the user's touch control. In step 110, if the fingertip did not hit the screen, then the whole process will return to starting point 79.

If in Step 100, the mouse trace record shows that the user's fingertip did not make a click action, then the method goes to Step 108. In Step 108, the mouse cursor is continuously displayed and moved on the screen, according to the 3-dimensional coordinates of the user's fingertip. This location can also be deemed as the projected location of the fingertip on the screen before making the next click action (before the fingertip pressing down to the screen). Then in Step 102, if the mouse cursor has not entered the region of any preset key/item at this moment, the default item of the system will be set to null in Step 106, and in the method goes back to the starting point 79 of the whole below. However, if in Step 102 it is determined that the mouse cursor has entered the region of a preset key/item, or in another word the mouse cursor is on the preset key/item, then the preset key/item will be set as the default item of the system, and its display is highlighted in the screen or emphasized by using a different color or style. If the default item of the system is already set, then it can be determined directly that the user touches the default item and the information is sent to the system as described above, when the user makes the click action next time. In this case, there is no need for the user to accurately click at the default item emphasized on the screen, as the system ignores the vertical movement of the user's fingertip within the region of the preset key in the virtual sensing space, in order to prevent mistaking the fingertip action when the fingertip presses down for a mouse movement. The user's fingertip only needs to click on the screen surface and the touch screen will sense the touch by the user and treat it as a click on the default item, without the need for the user to accurately click at the default item.

Figure 8:
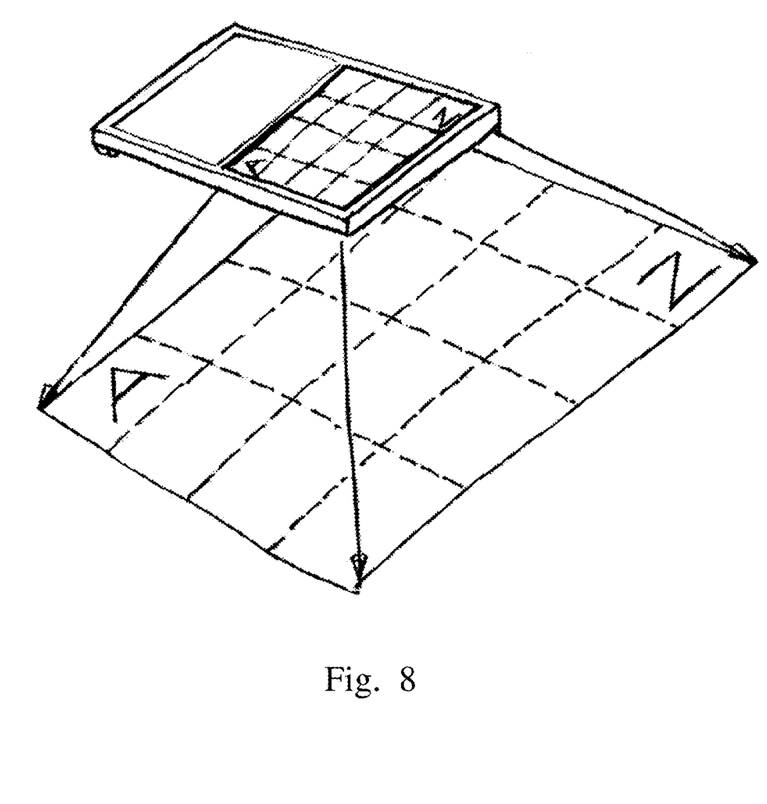
FIG. 8 shows a mobile device of which the back is equipped with a camera.
Figure 9:
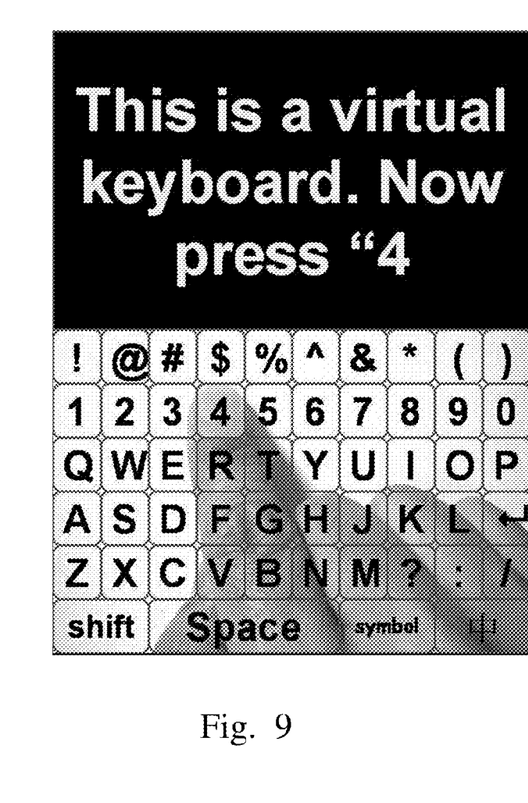
FIG. 9 shows the transparent image of the fingertip after mirror-flip on the screen of the mobile device in FIG. 5.

The above description has introduced the virtual touch sensing system and method in a first embodiment of the present invention. In other embodiments, the virtual touch sensing system and method may also be varied without departing from the spirit and object of the present invention. For example, in FIG. 8, the cameras installed on the mobile device can be installed at the back of the device. For example, the two cameras are installed on the back of the device, each departing from the other at a certain distance. In this way, the virtual sensing space similar to that defined in FIG. 2 is moved from above the screen of the device to a position at the back of the mobile device. At this moment, the user can still use a virtual touch sensing method similar to that described above to control the mobile device. In this operation mode, the system will first trace the position of the fingertip, and then calculate its space location, and its corresponding location on the screen. When the user makes an action of lifting up his fingertip at the vertical direction with respect to the screen of the mobile device, the corresponding key will be locked. If the lifted fingertip presses down within a predetermined time (if the predetermined time expires, then the key will be unlocked), the corresponding key is invoked. To provide better user experience, in a preferred embodiment the mobile device can further display the image of the user's fingertip captured by the camera on the screen of the device in a semi-transparent form, and superpose the image on the image of the virtual keyboard on the screen, which makes the user feels like he is using his fingers to click on real physical keyboard.

Figure 10:
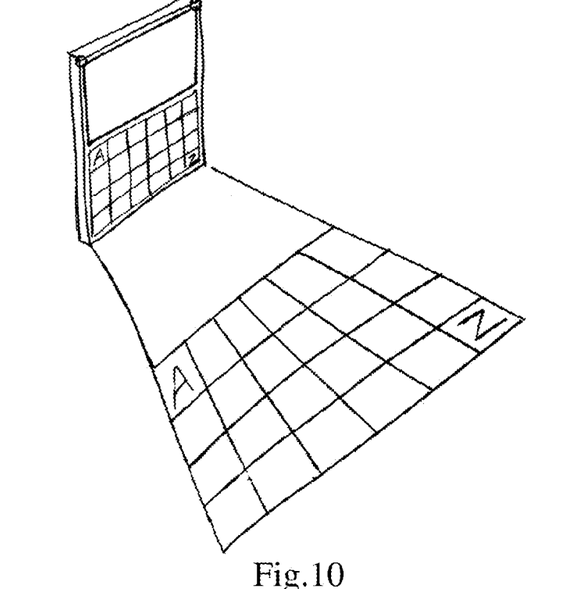
FIG. 10 shows a mobile device with cameras installed on two edge corners at the bottom of the device, according to one embodiment of the present invention.
Figure 11:
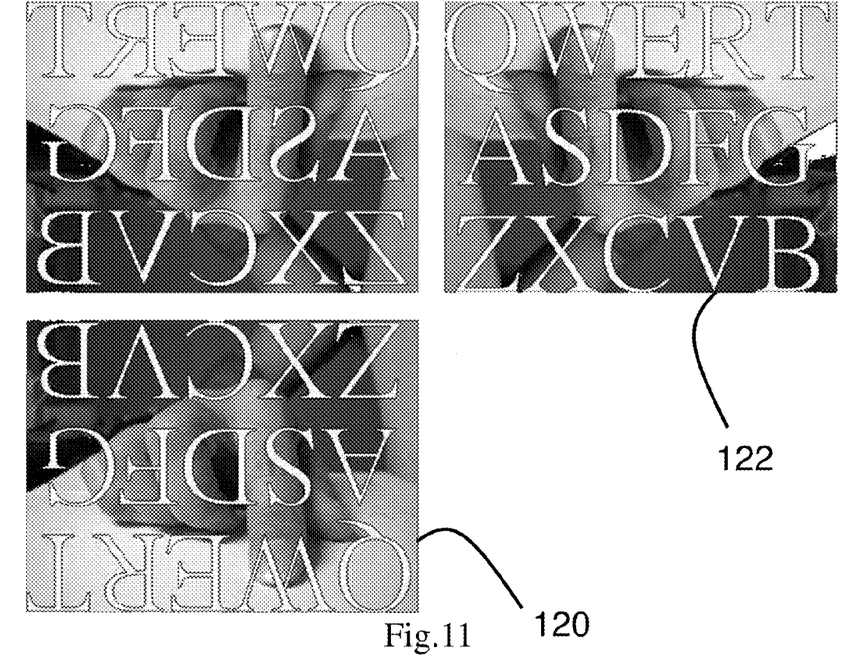
FIG. 11 shows the transparent image of the fingertip after mirror-flip on the screen of the mobile device in FIG. 7.

In another embodiment as shown in FIG. 10, the cameras installed on the mobile device can be installed at the two edge corners at the bottom of mobile device. The viewing range of the two cameras can also be adjusted to be substantially toward a space vertical to the screen of the mobile device. Therefore, the visual sensing space is also substantially vertical to the screen of the mobile device. In this way, the user can look up to the screen of the mobile device while operating on a position similar to traditional keyboard or touchpad using their hands, the same as when he is using a traditional notebook or desktop computer. This may bring very familiar operation experience to the user, and let him operate the mobile device in a way similar to their acquainted computer operating position. At this time, the user can still use the virtual touch sensing method similar to that described previously to control the mobile device. And here the image of the user's fingertip captured by the camera can also be displayed on the screen in a semi-transparent way, and superposed on the image of the virtual keyboard on the screen. However, as the finger activities are vertical to the display screen here, according to human's intuition feeling the image of the fingertip should move upward as the fingertip is moving toward the screen. If the image from the camera is directly displayed on the screen, the image of the fingertip will move downwards, which makes the user feel like the fingertip is moving in a reverse direction. Therefore, as shown in FIG. 11, the original image 120 captured by the camera should be horizontally flipped and vertically flipped to obtain the correct fingertip image 122.

Figure 12:
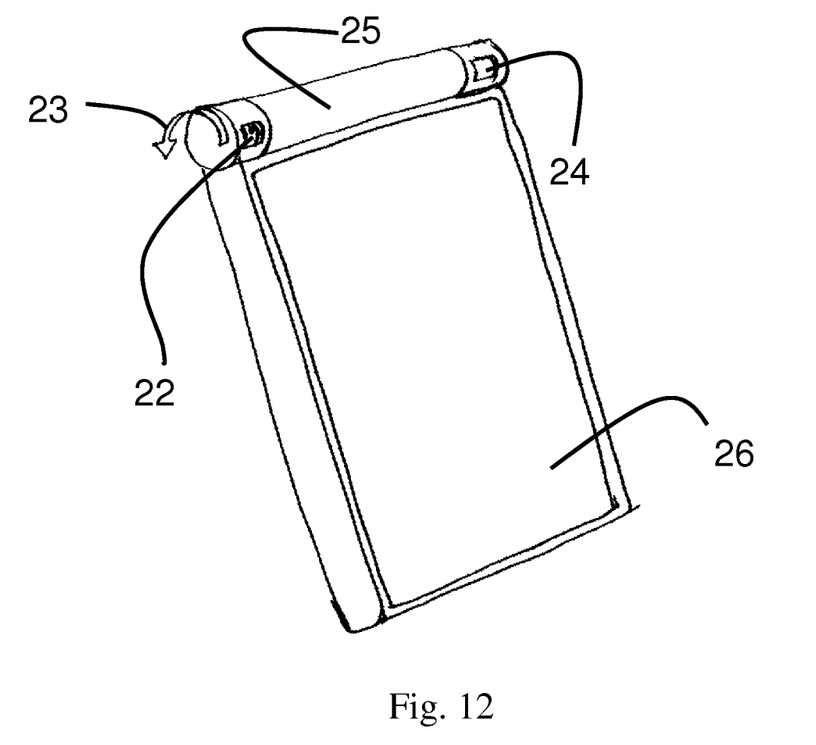
FIG. 12 shows a mobile device with cameras installed on two edge corners at the top of the screen of the device, while the cameras are capable of rotating, according to one embodiment of the present invention.
Figure 13A:
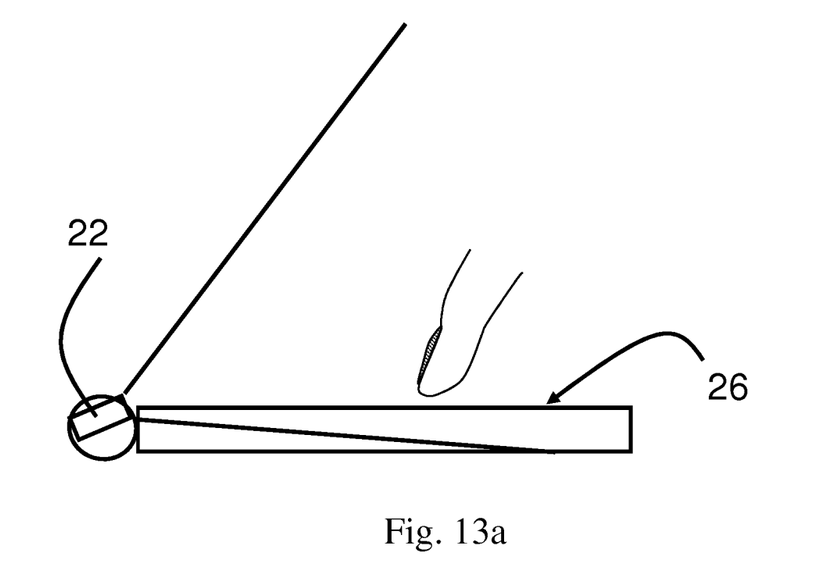
FIG. 13a-13c are the schematic diagrams showing the virtual sensing space formed when the cameras of the mobile device in FIG. 12 rotates to different angles.
Figure 13B:
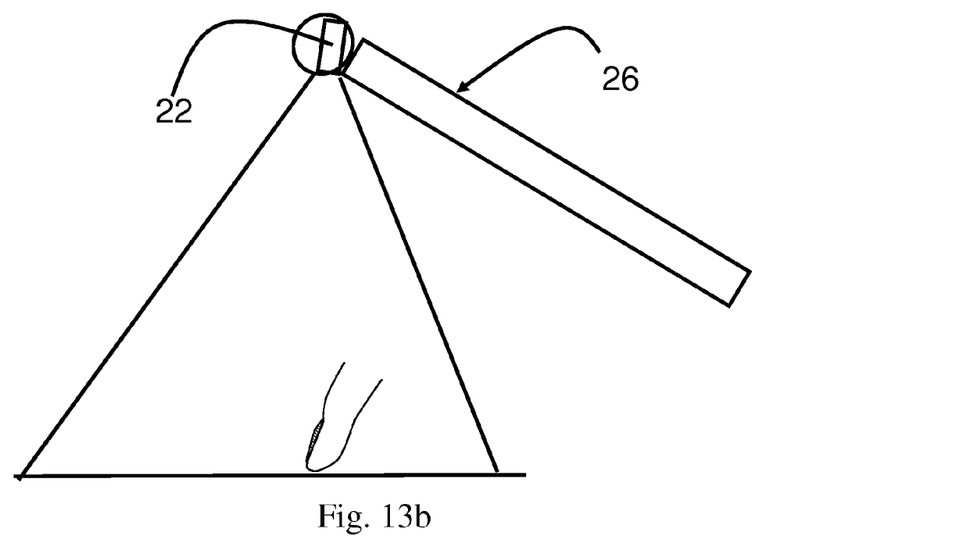
Figure 13C:
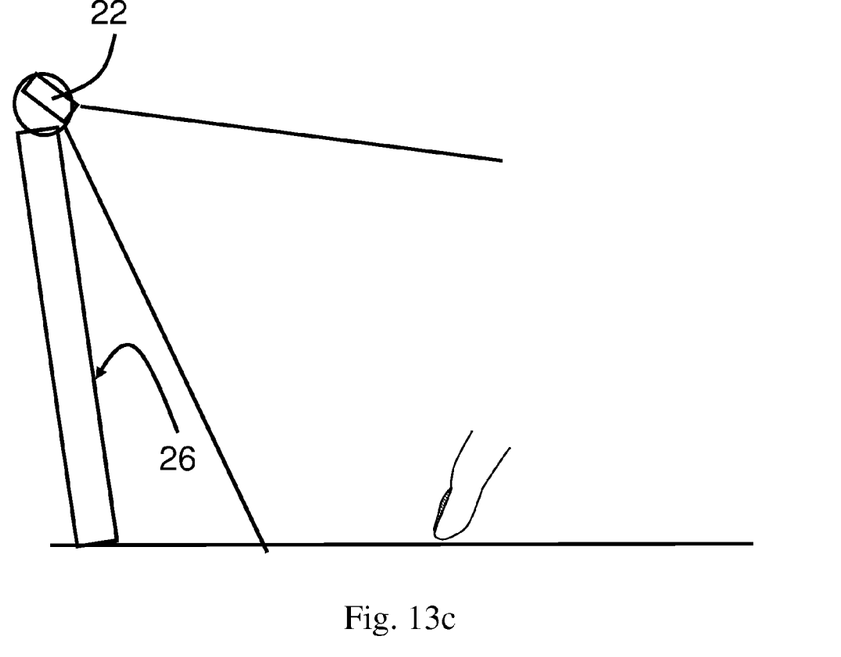

FIG. 12 shows another embodiment of the present invention, in which the mobile device is similar to that in FIG. 1. The difference is that the two cameras 22 and 24 installed on the left and right edge corners of the screen 26 of the mobile device are rotatable. The two cameras 22 and 24 are fixed on a rotation mechanism 25, thus are able to rotate in a direction as indicated by arrow 23. Here the angle of rotation is arbitrary, thus allows the angle between the operation plane of the virtual sensing space and the screen surface to be any angle. In this embodiment, the user can freely adjust the angle and viewing range of the two cameras, as shown in FIGS. 13a, 13b and 13c. In FIG. 13a, the cameras 22 and 24 have viewing ranges substantially toward the space right above the screen 26. In FIG. 13b, the cameras 22 and 24 have viewing ranges substantially toward the space at the back of the mobile device. In FIG. 13c, the cameras 22 and 24 have viewing ranges substantially at the space in front of the screen 26. When the two cameras have their angles and viewing ranges similar to those shown in FIG. 13a, FIG. 13b and FIG. 13c, the virtual sensing spaces formed are similar to those shown in FIG. 2, FIG. 8 and FIG. 10, respectively, of which the detailed description will not be repeated here.

After introducing the above embodiments, one skilled in the art can realize that other variation or structure, or equivalents, can be used without departing from the essences of the present invention. Accordingly, the above description should be deemed as limitations to the scope of the present invention as defined in the appended claims.

For example, the touch screen installed on the mobile device can be various types of the touch screens, such as capacitive touch screen or resistive touch screen. People with ordinary skills in the art should realize that other kinds of screens suitable for finger touching control, no matter now or in the future, can be used for the system and method of virtual touch sensing in the present invention.

In the embodiments of the mobile devices and virtual touch methods as shown in FIGS. 1 to 10, two cameras at the two edge corners of the screen are used to detect the 3-dimensional coordinates of the indicator. However, it should be understood that the number of cameras can be more than two. To increase the accuracy of detection and achieve more precise locating, three or more cameras can also be used.

In the several embodiments as described above, the installation position of the cameras can be the two edge corners at the top of the mobile device, two edge corners at the bottom of the mobile device, or at the back of the mobile device. Also, the orientation of the cameras can also be changed. One skilled in the art may easily realizes that the location of the cameras can be other locations on the body of the mobile device, or even exist as a separate component detached from the body of the mobile device. The orientation of the cameras can also be adjusted freely, as long as there are enough space in the viewing range of the cameras to form the virtual sensing space.

Besides using the virtual touch sensing method of the present invention on mobile devices, other fixed/large equipment can also utilize the virtual touch sensing method of the present invention. For example, the cameras can be installed at the two top corners of the electronic whiteboard in the classroom to realize pointing by using virtual touch. Alternatively, the cameras can be installed at the two top corners of the projector screen to achieve virtual touch sensing on a large screen.

In the embodiments described above, cameras are used to detect the 3-dimensional coordinates of the indicator. However, one skilled in the art should realize that other kinds of sensors can also be used to detect 3-dimensional coordinates, such as electromagnetic sensors, infrared sensors or supersonic sensors. These kinds of sensors may need to use a different calculation algorithm (such as triangulation) to compute the 3-dimensional coordinates of the indicator in the space, and converting it to a 2-dimensional coordinates on the screen. However, their working principles are covered by the present invention.

The description above mentioned that the virtual touch sensing method can mainly be used as a mouse or virtual keyboard. Other types of input methods, such as mouse trace, drawing, handwriting, multi-touch, etc, can be used via the virtual touch sensing method of the present invention as well, without departing from the spirit of the present invention.

Although the above embodiments showed that the virtual sensing space has an area larger than that of the display, it is obvious to one skilled in the art that the virtual sensing space can be similarly designed to have an area smaller than or equal to that of the display, and still fall within the scope of the present invention.

What is claimed is:

1. A method for virtual touch sensing, comprising steps of:
a) detecting coordinates of an indicator in a virtual sensing space by using more than one sensors; and
b) calculating corresponding screen coordinates on a screen according to said coordinates of said indicator; wherein an operation plane in said virtual sensing space having an area independent to that of said screen; wherein said sensors further comprise a first camera and a second camera; said first camera being substantially located at a first edge corner of said display and said second camera being substantially located at a second edge corner of said display; a location of said indicator in a 2-dimensional image of said first camera being $P_L(x_l, y_l)$; a location of said indicator in a 2-dimensional image of said second camera being $P_R(x_r, y_r)$; a 3-dimensional coordinate $P(x, y, z)$ of said indicator in said virtual sensing space being calculated using the following equations:

$$x=b(x_l+x_r)/[2(x_l-x_r)]$$

$$y=b(y_l+y_r)/[2(y_l-y_r)]$$

$$z=bf/(x_l-x_r)$$

wherein b is a straight line distance between said first camera and said second camera, and f is a focal length of said first camera and said second camera.

2. The method of claim 1 further comprises displaying a mouse cursor on said screen according to said screen coordinates of said indicator; said mouse cursor moving in said screen according to movement of said indicator when said indicator moves substantially on said operation plane in said virtual sensing space.

3. The method of claim 2, further comprises:
a) dividing at least one region in said screen, said region being a clickable element range of a preset key;
b) determining if said mouse cursor has entered said clickable element range of one said preset key according to a location of said mouse cursor on said screen; and
c) sensing a click action of said indicator on a surface of said screen and treating said click action as an input operation to said preset key when said mouse cursor enters said clickable element range of said preset key; said click action of said indicator within said range of preset key in said virtual sensing space not being a command to move said cursor.

4. The method of claim 2, further comprises:
a) dividing at least one region in said screen, said region being a clickable element range of a preset key;
b) determining if said mouse cursor has entered said clickable element range of one said preset key according to a location of said mouse cursor on said screen;
c) locking said preset key if said indicator moves on a predetermined direction in said virtual sensing space when said mouse cursor enters said clickable element range of said preset key;
d) invoking said preset key if said indicator substantially moves to a direction reverse to said predetermined direction within predetermined time;
e) unlocking said preset key if said indicator substantially does not move to said direction reverse to said predetermined direction within said predetermined time.

5. The method of claim 1, wherein said sensors are located at a back of said screen.

6. The method of claim 5, wherein said sensors capture a plurality of images of said indicator, said plurality of images being displayed in said screen in semi-transparent form.

7. The method of claim 1, wherein an angle between said operation plane of said virtual sensing space and a surface of said screen is arbitrary.

8. The method of claim 1, wherein said area of said operation plane of said virtual sensing space is dynamically adjusted according to a user preference.

9. The method of claim 1, wherein said indicator has a feature point on a surface of said indicator for said sensors to sense; said feature point being a matching point for images of said first camera and said second camera.

10. The method of claim 9, wherein said feature point is a straight line with three round dots thereon; the middle point of said three dots being said matching point for images of said first camera and said second camera.

11. A system for virtual touch sensing, comprising:
a) a microprocessor;
b) a display screen; and
c) more than one sensors, said sensors detecting coordinates of an indicator in a virtual sensing space; said microprocessor calculating corresponding screen coordinates on a screen according to said coordinates of said indicator; wherein an operation plane in said virtual sensing space having an area independent to that of said screen;
wherein said sensors further comprise a first camera and a second camera; said first camera being substantially located at a first edge corner of said display and said second camera being substantially located at a second edge corner of said display; a location of said indicator in a 2-dimensional image of said first camera being $P_L(x_l, y_l)$; a location of said indicator in a 2-dimensional image of said second camera being $P_R(x_r, y_r)$; a 3-dimensional coordinate $P(x, y, z)$ of said indicator in said virtual sensing space being calculated using the following equations:

$$x=b(x_l+x_r)/[2(x_l-x_r)]$$

$$y=b(y_l+y_r)/[2(y_l-y_r)]$$

$$z=bf/(x_l-x_r)$$

wherein b is a straight line distance between said first camera and said second camera, and f is a focal length of said first camera and said second camera.

12. The system of claim 11, wherein said screen displays a mouse cursor, said mouse cursor moving on said screen according to a movement of said indicator when said indicator substantially moving on said operation plane in said virtual sensing space.

13. The system of claim 12, wherein at least one region is divided in said screen; said region being a clickable element range of a preset key; said microprocessor determining if said mouse cursor has entered said clickable element range of one said preset key according to a location of said mouse cursor on said screen; when said mouse cursor enters said clickable element range of said preset key, said click action of said indicator within said range of preset key in said virtual sensing space not being a command to move said cursor; a click action of said indicator on a surface of said screen being sensed by said screen and treated as an input operation to said preset key.

14. The system of claim 12, wherein at least one region is divided in said screen; said region being a clickable element range of a preset key; said microprocessor determining if said mouse cursor has entered said clickable element range of one said preset key according to a location of said mouse cursor on said screen; when said mouse cursor enters said clickable element range of said preset key, a movement of said indicator on a predetermined direction in said virtual sensing space resulting in said preset key being locked; if said indicator substantially moving to a direction reverse to said predetermined direction within predetermined time, said preset key being invoked; if said indicator not substantially moving to said direction reverse to said predetermined direction within said predetermined time, said preset key being unlocked.

15. The system of claim 11, wherein said area of said operation plane of said virtual sensing space is dynamically adjusted according to a user preference.

16. The system of claim 11, wherein said indicator has a feature point on a surface of said indicator for said sensors to sense; said feature point being a matching point for images of said first camera and said second camera.

17. The system of claim 16, wherein said feature point is a straight line with three round dots thereon; the middle point of said three dots being said matching point for images of said first camera and said second camera.

18. The system of claim 11 further comprises a mobile device, said microprocessor, said screen and said more than one sensors being installed in said mobile device.

* * * * *